(No Model.)
2 Sheets—Sheet 1.
L. C. PERKINS.
BICYCLE.
No. 309,086. Patented Dec. 9, 1884.
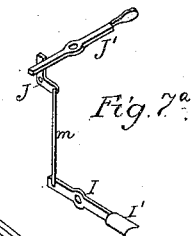
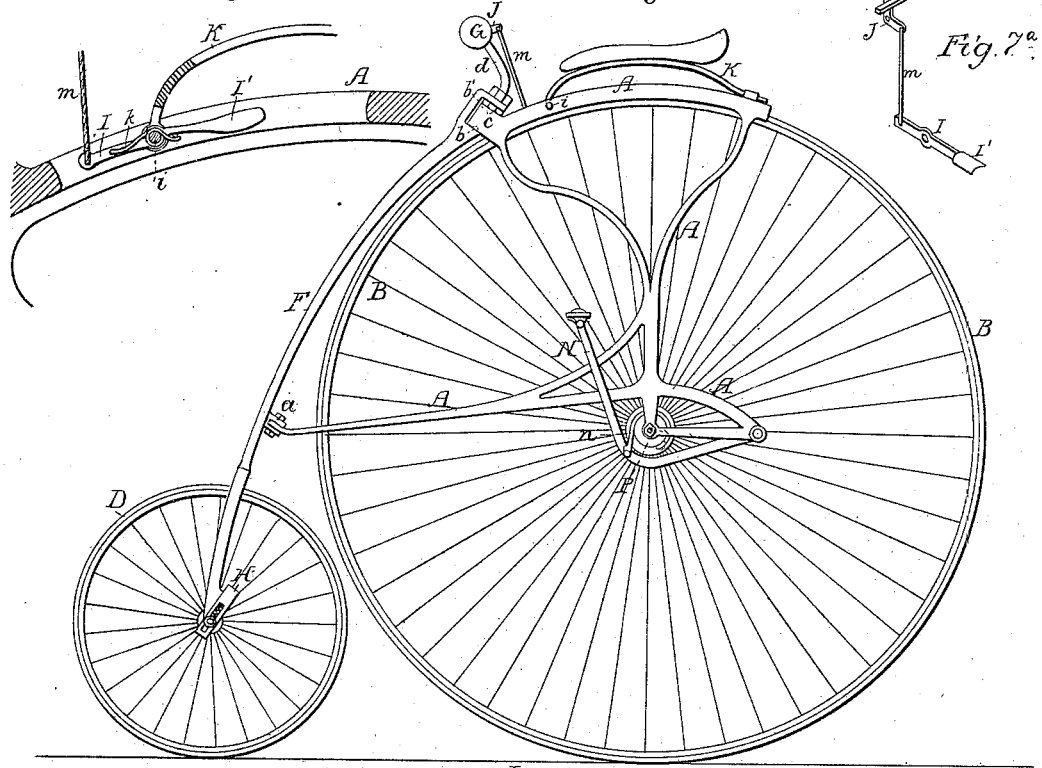
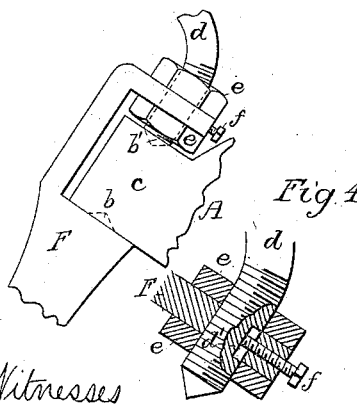
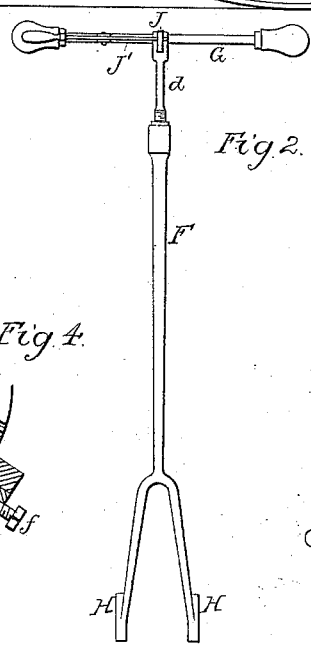
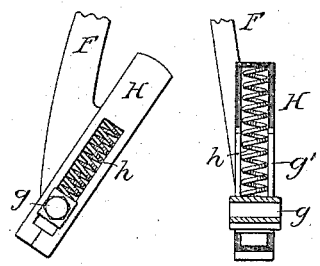
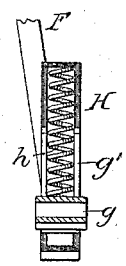
Witnesses
John E. Parker
Harry Smith
Inventor
Lyman C. Perkins
by his Attorneys
Howson & Sons (No Model.) 2 Sheets—Sheet 2.

L. C. PERKINS.
BICYCLE.

No. 309,086. Patented Dec. 9, 1884.

Witnesses
John E. Parker
Harry Smith

Inventor
Lyman C. Perkins
by his Attorneys
Howson & Sons

N. PETERS, Photo-Lithographer, Washington, D. C.

UNITED STATES PATENT OFFICE.

LYMAN C. PERKINS, OF PHILADELPHIA, PENNSYLVANIA.

BICYCLE.

SPECIFICATION forming part of Letters Patent No. 309,086, dated December 9, 1884.

Application filed July 7, 1884. (No model.)

*To all whom it may concern:*

Be it known that I, LYMAN C. PERKINS, a citizen of the United States, residing in Philadelphia, Pennsylvania, have invented certain Improvements in Bicycles, of which the following is a specification.

My invention consists of certain improvements in bicycles of the class which have the steering-wheel in front, the objects of my improvements being to strengthen and render more shapely than usual the frame of the machine, to prevent jarring of the bicycle when the small wheel meets with an obstruction, to firmly secure the handle-bar to the steering-frame, to provide a simple brake-operating device, and to improve the character of the driving-clutch. These objects I attain in the manner hereinafter set forth, reference being had to the accompanying drawings, in which—

Figure 8:
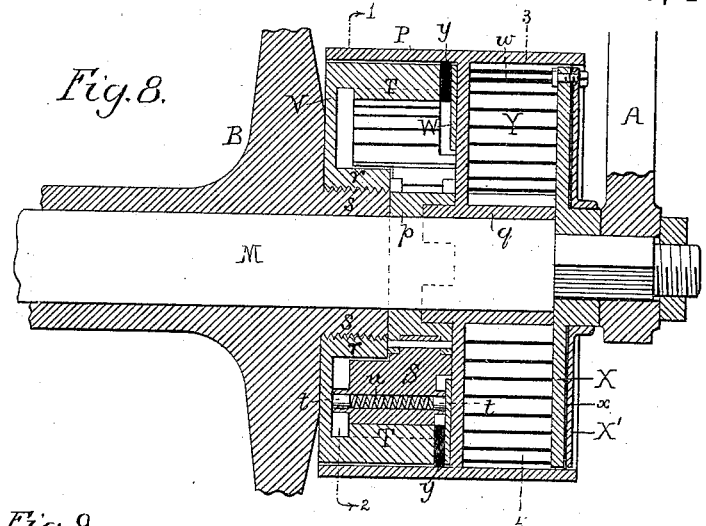
Figure 9:
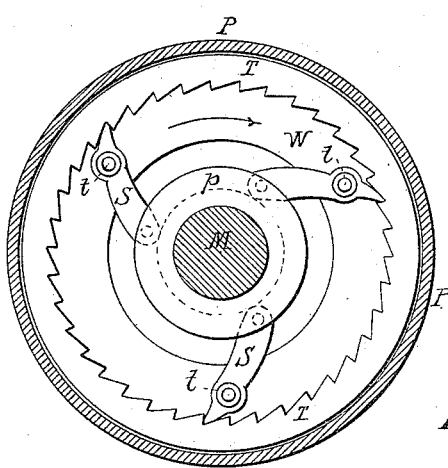
Figure 10:
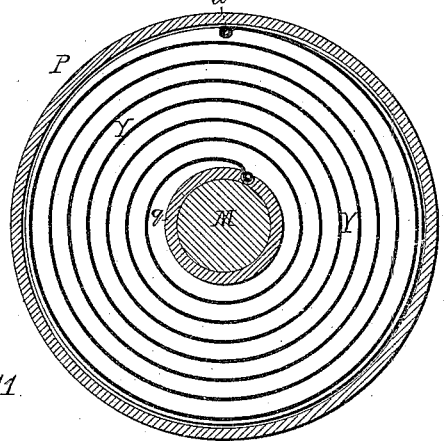
Figure 11:
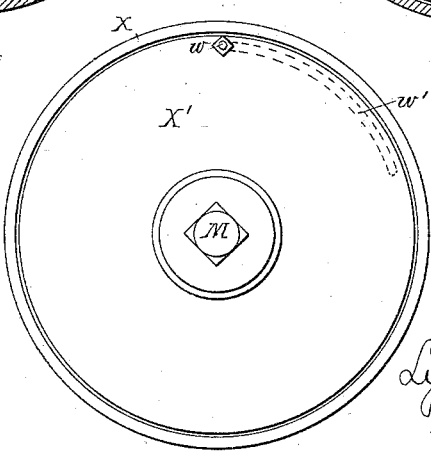

Figure 1, Sheet 1, is a side view of a bicycle with my improvements; Fig. 2, a front view of the steering-bar; Figs. 3 to $7^a$, detached views, on a larger scale, of parts of the bicycle; Fig. 8, Sheet 2, an enlarged section of one of the driving-clutches; Fig. 9, a transverse section on the line 1 2, Fig. 8; Fig. 10, a transverse section on the line 3 4, Fig. 8; Fig. 11, a face view of Fig. 8; and Fig. 12, a view of part of Fig. 9, with some of the parts in a different position.

In Fig. 1, A represents the main frame of the bicycle; B, the large or driving wheel; D, the small or steering wheel, and F the frame which carries the latter, this frame being forked at the lower end to receive the wheel D, and being pivoted to the frame A by a pin, $a$, and by lugs $b\ b'$, the said pin $a$ being near the lower end of the frame, and the lugs $b\ b'$ being adapted to sockets in a boss, $c$, at the upper end of the frame.

Usually the frame A carries at the front an inclined tube, through which the steering-rod passes and in which it has its bearing. By using, in place of this, the independent pivotal points, as shown, I am enabled to make the frame F of the curved form represented, and thus impart a more graceful appearance to the bicycle than is possible when the straight frame is used.

The upper pivot-lug, $b'$, forms part of the stem $d$ of the handle G, and said stem is threaded for the reception of nuts $e\ e$, which bear upon opposite sides of the frame F, and serve as a means of adjusting the stem $d$, so that the lug $b'$ will always fit snugly in its socket, and wear of the parts can be readily taken up. In order, however, to prevent the handle from being twisted around out of position on the frame, the stem $d$ has in one side a recess, $d'$, to which is adapted the point of a set-screw, $f$, carried by the frame F, as shown in Fig. 4.

The axle of the small steering-wheel D is adapted to boxes $g$, which are guided in slots $g'$ in casings H, formed on the opposite legs of the forked lower end of the frame F, the boxes being acted upon by springs $h$ contained in the casings, so that the wheel D is free to yield when it meets with an obstruction, and thus prevents the jarring of the main frame.

I have shown coiled springs $h$, but rubber blocks or helical springs may, it will be evident, be substituted for the same, if desired.

The upper portion of the frame A is slotted near the front end, as shown in Fig. 7, for the reception of the brake-lever I, which is pivoted to the frame by a transverse pin, $i$. One arm of this lever carries the brake-shoe I', and the other arm is connected by a wire, cord, chain, or other flexible connection, $m$, to one arm of a bell-crank lever, J, which is hung in a slot in the handle, and the other arm of which is acted on by the usual brake-lever, J, on the handle. (See Fig. 2.)

The combination of brake-lever J' and bell-crank lever is one that has been heretofore used in bicycles, the brake-shoe, however, being carried directly by the bell-crank lever and acting on the rim of the driving-wheel, which is carried by and turns with the yoke having the handle. In front-wheel-steering bicycles, however, the handle-bar has a movement independent of the frame A, which carries the driving-wheel, hence the use of the brake-lever on said frame A; and the connection of the same to the lever on the handle-bar by a flexible connection, the twisting of which (as the handle-bar is turned to steer the bicycle) will not interfere with its efficiency.

A spring, $k$, serves to depress the front arm of the lever I and hold the brake-shoe I' free from contact with the driving-wheel under ordinary circumstances. In the present instance the front end of the seat-spring K is secured to the pin $i$, said spring being forked for the reception of the lever I; but this construction is not absolutely essential.

If desired, the brake-levers J and J' may be dispensed with, and the handle-bar may be free to turn in bearings on the stem $d$, and may have a drum, to which the upper end of the cord or chain $m$ is attached, so that by slightly turning the handle-bar in its bearings the cord will be tightened and the brake applied. The use of the levers J J' is, however, preferred.

The driving-wheel B is operated by clutch-gears on opposite sides of the hub, each gear being driven by a strap, $n$, connected at one end to the drum of the clutch and at the opposite end to a treadle-lever, N, hung to the frame A, as shown in Fig. 1.

My improved clutch-gear is shown in Figs. 8 to 12, on reference to which M is the axle on which the driving-wheel turns, this axle being secured to the frame A, so as to be incapable of movement independently thereof.

The drum P, to which the driving-strap $n$ is connected, is free to turn on the axle, and to the hub $q$ of this drum is clutched a hub, $p$, to which are hung the inner ends of a series of pawls, S, the outer ends of which are adapted to engage with an internal rack, T, in a drum, V, the hub $r$ of which is screwed or otherwise securely fastened to the hub $s$ of the wheel B.

Figure 12:
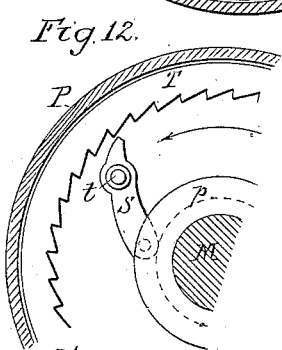

Each of the pawls S has a transverse opening, Fig. 8, for the reception of plugs $t$ and a spring, $u$, the tendency of the spring being to force one of said plugs against the inner face of the drum V and the other against a plate, W, bolted to the drum. These spring-plugs serve to impart a certain retaining-friction, which prevents the pawls from dropping down and engaging with the teeth of the rack T on the backward movement of the hub $p$. The first result of this backward movement is to draw the pawls inward until their ends are free from the teeth, as shown in Fig. 12, in which position the pawls remain without change until the motion is reversed, whereupon the first result is the throwing out of the ends of the pawls until they engage with the teeth. By this means the objectionable clicking noise which accompanies the backward movement of an ordinary pawl-and-ratchet clutch is effectually overcome.

The retraction of the drum P and pawl-hub is effected, as usual, by a spring, Y. This spring is connected at the inner end to the hub $q$ of the drum P, and at the outer end to a bolt, $w$, which is secured by suitable nuts to a plate, X, secured to the axle M, so that the inner end of the spring is the moving end, the spring winding and unwinding from the inside, so as to avoid that objectionable scraping of the convolutions of the spring against each other which results when the inner end of the spring is fastened and the outer end movable.

The bolt $w$ is adapted to a slot, $w'$, in the plate X, (see dotted lines, Fig. 11,) so that the spring can be tightened as desired, and between the plate X and an outer plate, X', intervenes a washer, $x$, which fits snugly to the inside of the flange of the drum P and prevents the access of dust or moisture to the spring. A washer, $y$, interposed between the drum V and plate W, similarly prevents the access of dust or moisture to the gearing of the clutch.

The plate X' and washer $x$ each have an opening, $v$, for the reception of the bolt $w$, which secures the spring Y to the plate X, both the washer and plate X' turning on the hub of said plate X when the bolt $w$ is moved to tighten the spring Y.

I claim as my invention—

1. The combination of the main frame A and driving-wheel B of the bicycle with the steering-wheel D, carried by a curved frame, F, hung to the frame A by upper and lower independent pivots, as set forth.

2. The combination of the frame A, having a boss, $c$, the driving-wheel B, the steering-wheel D, the frame F, and the pivot-pin $a$ and pivot-lugs $b\ b'$, as set forth.

3. The combination of the frame A, having a boss, $c$, with the frame F, having pivot-lugs $b\ b'$, the upper of which is threaded for the reception of adjusting and retaining nuts $e$, as set forth.

4. The combination of the frame A, the frame F, the pivot-lugs $b\ b'$, the nuts $e$, the handle-stem $d$, forming the lug $b'$, and having a recess, $d'$, and the bolt $f$, whereby twisting of the handle is prevented, as set forth.

5. The combination of the frame A and its driving-wheel, the brake-lever I, hung to said frame, the swinging steering-frame and handle-bar, and a flexible connection, $m$, between said brake-lever and braking mechanism on the handle-bar, as specified.

6. The combination, in a ratchet-clutch for bicycles, of the drum V, having an internal rack, the driving-drum P, and a hub, $p$, connected to said driving-drum and carrying pawls S, and two spring-plugs, $t\ t$, projecting from the opposite sides of each pawl and forming a frictional retainer therefor, as set forth.

7. The combination of the drum V and its rack, the drum P, and the pawls, and a retracting-spring connected at the inner end to the hub of said drum P and at the outer end to a fixed plate, as specified.

8. The combination of the pawl-drum, retracting-spring, bolt $w$, and plate X, having a slot, $w'$, for the adjustment of the bolt, as described.

9. The combination of the driving-drum, the fixed plate X, the cover-plate X', and the protecting-washer $x$, as set forth.

10. The combination of the driving-drum, the drum V on the driving-wheel, and the washer $y$, as set forth.

In testimony whereof I have signed my name to this specification in the presence of two subscribing witnesses.

LYMAN C. PERKINS.

Witnesses:
JOHN E. PARKER,
HARRY SMITH.